Aug. 23, 1949.  E. S. HEWITT  2,479,571
ELECTRIC DRIER
Filed April 10, 1948  3 Sheets-Sheet 1
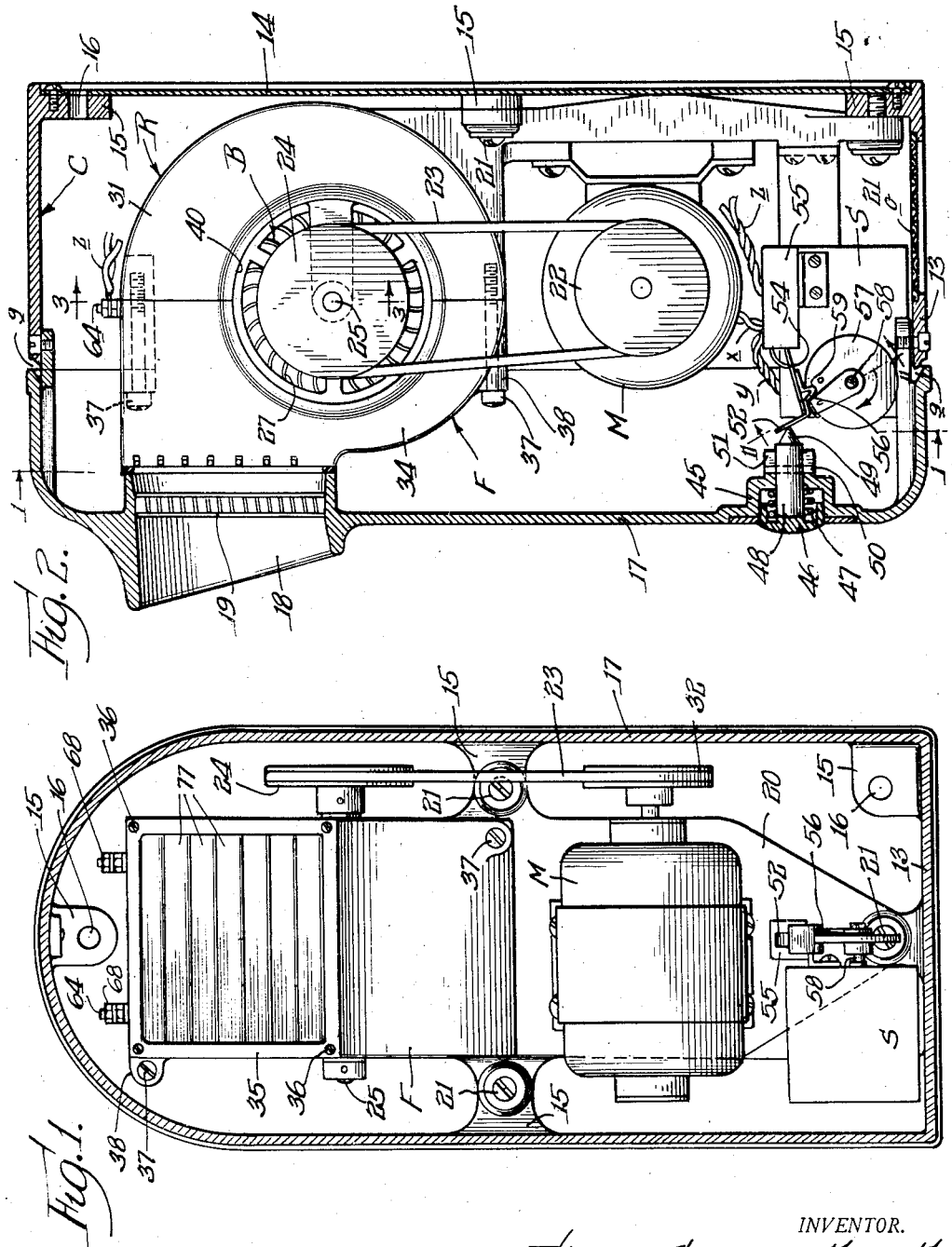
INVENTOR.
Elmer Spencer Hewitt
BY
Banning & Banning
attys Aug. 23, 1949.  E. S. HEWITT  2,479,571
ELECTRIC DRIER
Filed April 10, 1948  3 Sheets-Sheet 2

INVENTOR.
Elmer Spencer Hewitt
BY
Danning & Danning
attys.

Aug. 23, 1949.     E. S. HEWITT     2,479,571
ELECTRIC DRIER
Filed April 10, 1948     3 Sheets-Sheet 3
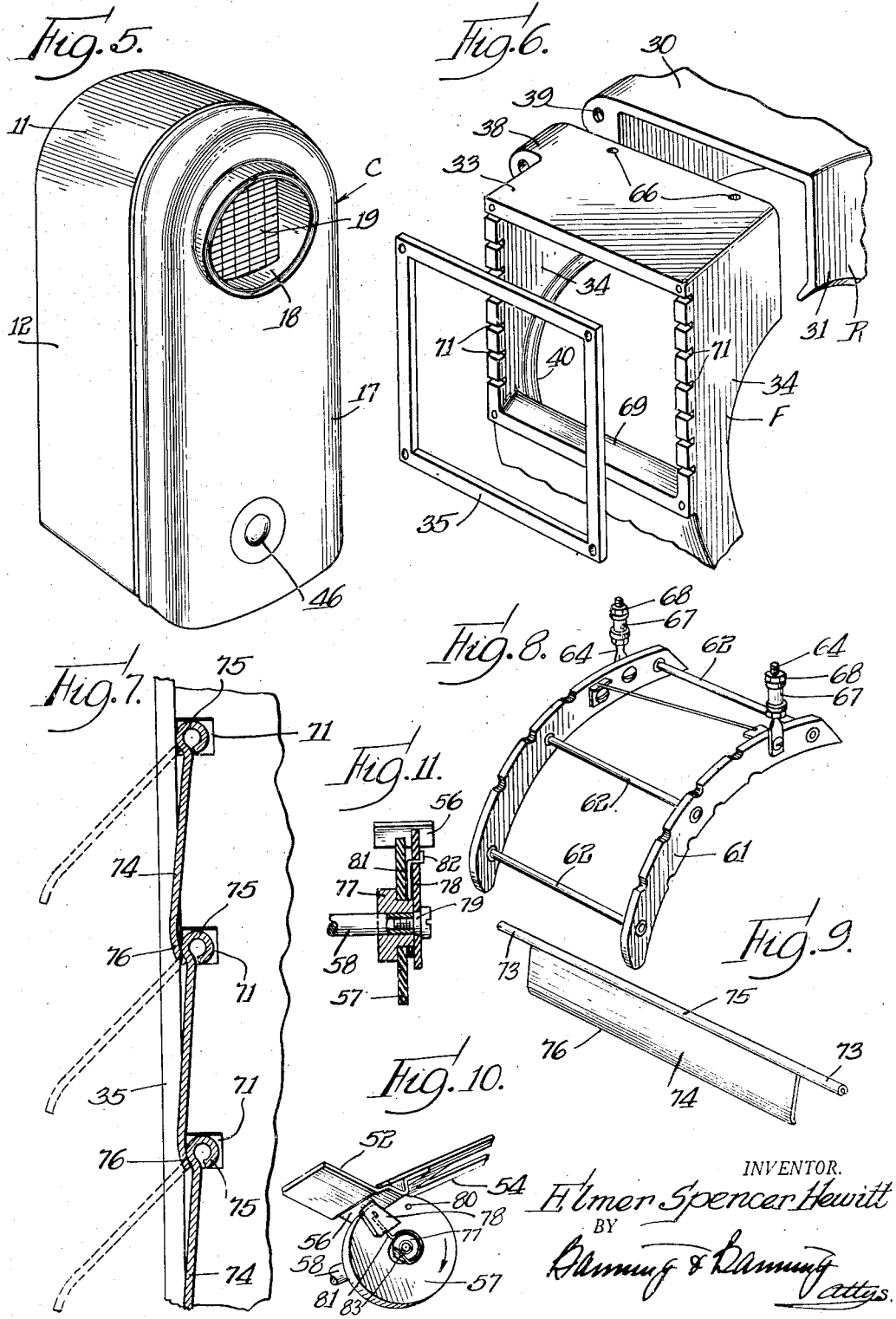
INVENTOR.
Elmer Spencer Hewitt
BY
Banning & Banning
attys.

Patented Aug. 23, 1949

2,479,571

UNITED STATES PATENT OFFICE 2,479,571

ELECTRIC DRIER

Elmer Spencer Hewitt, Wilmette, Ill., assignor to Electric-Aire Engineering Corporation, Chicago, Ill., a corporation of Illinois Application April 10, 1948, Serial No. 20,197

14 Claims. (Cl. 219—39)

This invention relates to a dryer which may be fixedly mounted on a wall or stand, with connections to an electrical source whereby to operate concurrently a heater and a blower for discharging the heated air outwardly in a controlled stream.

The objects served by this invention are many. The mechanism is compact, thereby permitting its accommodation within a casing of small size. It may also be produced and assembled at reasonable expense, thereby adapting the device for sale at an attractive price. More particularly, however, this invention is concerned with certain special features of utility, including plural louvres arranged in the path of the air discharged from the blower; a simple and effective construction of heating unit which may be readily assembled in place for cooperation with the blower in a very effective manner; and with various other details of construction which will be explained at length in the ensuing description.

A suggestive embodiment of my invention is set forth in the accompanying drawing wherein—

Figure 1 is a vertical section through the mechanism casing, taken on line 1—1 of Fig. 2;

Fig. 2 is a central vertical section through the casing, the mechanisms therewithin being shown in elevation;

Fig. 5 is a view in perspective of the casing for accommodation of the several mechanisms;

Fig. 6 is a fragmentary detail in perspective of the blower housing, looking toward the discharge end thereof;

Fig. 7 is an enlarged fragmentary detail in vertical section of the louvre assembly at the mouth of the blower;

Fig. 8 is a perspective view of the framework for the heater unit;

Fig. 9 is a view in perspective of one of the louvres removed from its support;

Fig. 10 is a perspective view of a suggestive cam mechanism for operating the switch which controls the operative cycle of the heater and blower units; and Fig. 11 is a sectional view thereof, taken on line 11—11 of Fig. 2.

Figure 3:
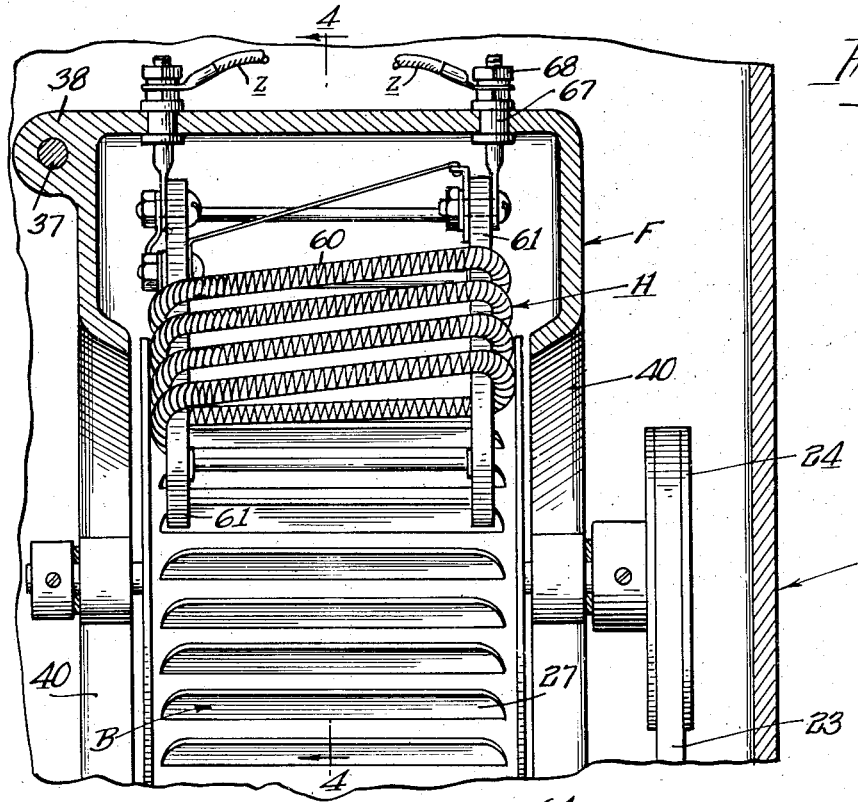
Fig. 3 is an enlarged fragmentary detail in section, taken on line 3—3 of Fig. 2.

According to the construction shown, an open-front casing C is formed with a rounded top 11 which merges with spaced side walls 12 that are joined to a bottom wall 13. The casing is desirably provided with a back plate 14 detachably secured to lugs 15 through certain of which is a hole 16 to receive a bolt (not shown) whereby to affix the casing to a wall. The open front of the casing is provided with a cover 17 having near its top a discharge opening 18 defined by circular enclosing walls which project outwardly for a desired distance. Between the cover and casing is an air gap g, and in the bottom wall 13 is a screened air inlet opening o. The discharge opening is provided with a protecting grid or screen 19.

The cover, when secured in place, completes an enclosure within the casing for the accommodation of the several mechanisms now to be described. These comprise a motor-blower unit having a base 20 which may be cushion-connected at three points 21 to certain of the lugs 15 which extend inwardly from the surrounding casing walls. Supported upon the base is a motor M to whose shaft is affixed a pulley 22 driving a belt 23 which passes over a second pulley 24 affixed to the shaft 25 of a blower B which may be of squirrel cage type. This unit and its mounting may desirably follow the construction of the Hewitt Patent No. 2,294,904 dated September 8, 1942.

Figure 4:
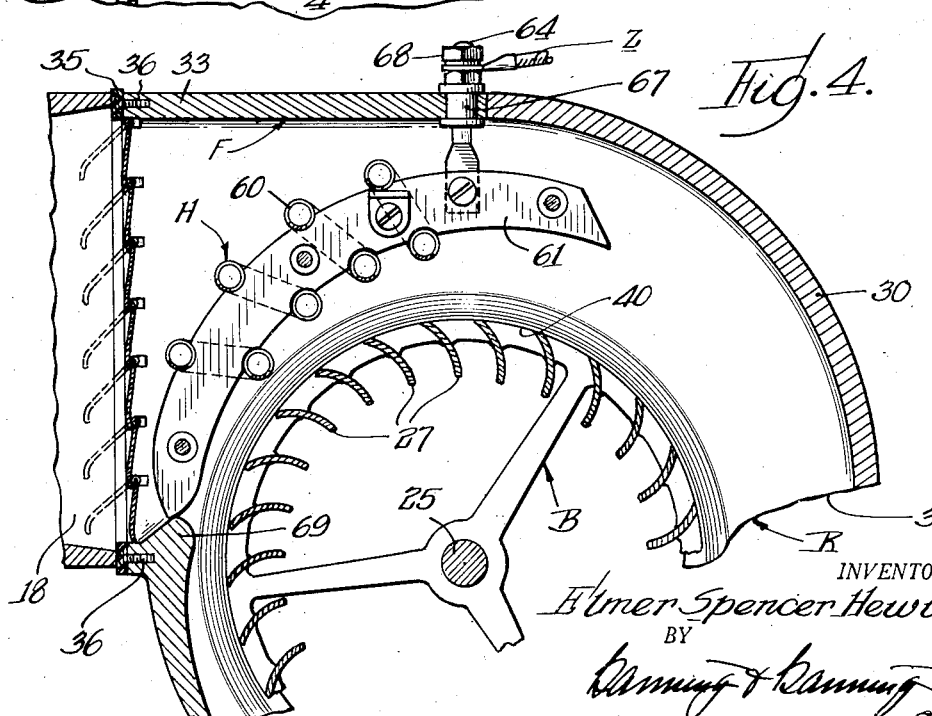
Fig. 4 is a similar view, taken on line 4—4 of Fig. 3.

The blower vanes 27 are rotated through a circular path within a blower housing comprising a front section F and a rear section R, the latter being provided with a peripheral wall 30 and sides 31 and the former with a straight top wall 33 forming a continuation of the peripheral wall 30 of the rear section (see Fig. 4). Side walls 34 are also included in the forward section which terminates in a forwardly facing mouth of rectangular contour directly opposite and rearwardly of the discharge opening 18 in the casing front cover. The walls defining this opening also extend rearwardly, thus providing a short duct which terminates in a rectangular contour substantially engaging the mouth of the discharge opening of the blower housing, a gasket 35 of insulating material being interposed therebetween and held in place as by drive screws 36 whose heads are countersunk. The forward and rear sections of the housing may be joined into a unitary structure as by bolts 37 which are entered through lugs 38 on the front section to engage with threaded openings 39 in ears that project laterally from the rear section. Central air inlet openings 40 are provided in the side walls 31 and 34 of the housing, as shown.

The casing front cover 17 is provided with an inset boss 45 for receiving a button 46 inwardly cupped to receive therewithin a compression spring 47 which urges the button to a normal outer position; the shank 48 of the button extends inwardly to terminate in a cone end 49 adjacent which is a cross pin 50 whose protruding ends are slidably disposed in slots formed on opposite sides of a guide 51 at the inner end of the boss, thereby limiting the outward movement of the button. The inward movement of the button is arrested when its cup engages the base wall of the boss 45. The cone end of the button shank lines oppositely of a cam finger 52 which projects from a spring contact arm 54 forming part of a switch 55 which is placed in an electrical circuit (not shown) leading from a source of energy. Connections $x$ lead from the switch to the motor M whereby to control the operation thereof. Depending from the switch arm 54 is a ratchet tooth 56 constituting a follower in engagement with the periphery of a fiber disc 57 affixed to a bushing 77 which is mounted on a shaft 58 in connection with a timer mechanism which may be a synchronous motor S. Circuit connections $y$ are extended between the switch 55 and the motor S.

With each inward movement of the button 46 in response to manual pressure applied thereto, the finger 52 is lifted to disengage the follower 56 from a notch 59 in the disc 57, this notch having a contour similar to that of the ratchet tooth which engages therein; the switch is thereupon closed to establish circuit connections to (1) the synchronous motor S, (2) the blower motor M, and (3) a heating unit H (shortly to be described). With starting of the motor, the disc 57 will also commence to revolve, its movement proceeding in the direction of the arrows (see Figs. 2 and 10).

Means is provided to assure that the operating finger 52 of the switch 55, once it has been cammed toward closing position, will be prevented from reversing its movement until after the circuit to the timer mechanism has been fully established. For this purpose a latch arm 78 of fiber or the like is pivotally supported upon a screw 79 whose shank is threaded for engagement within a socket formed axially of the shaft 58 (see Fig. 11). The radial length of this latch arm is slightly greater than the radius of the disc 57; it is normally maintained toward a stop pin 80, affixed to the disc, by a wire spring 81 disposed radially between the disc and latch arm with its outer end 82 offset for hooking through a hole in the latch arm; the inner end portion of the spring which is curled to pass around the bushing 77 terminates in a straight section 83 which is received in a chord slot in the end of the bushing. The spring so formed and arranged exerts a light tension on the latch arm whose free end remains engaged within the inclined face of the follower 56 so long as the latter is disposed in the notch 59 in the disc. Whenever this follower is cammed out of the notch, in response to operation of the switch button 46, the latch arm will at once advance rotatively beneath the follower to a position opposite the notch 59 where it is arrested by the stop pin 80. The effect of this latch arm movement is to block the way for return of the follower into the notch until the disc 57 has completed a movement of revolution through 360°. By the means described, I have provided what amounts to a full-stroke mechanism which requires that the button 46 be pushed into a predetermined point in order to insure starting of the timer mechanism and associated units. With initiation of a full-cycle operation of the timer mechanism, the disc 57 will revolve slowly through 360°, the latch arm advancing therewith until near the completion of this movement when its free end will be engaged by the follower 56 which then retracts the arm back away from the stop pin 80, against the tension of the spring 81, to the initial position shown in Fig. 10. As a consequence of retraction of the latch arm, the notch 59 is again exposed to receive the follower which is then free to engage therein to open the switch and break the circuit to the several operating units. The parts are thereupon restored to their normal positions (see Fig. 2 which continues so long as the switch remains open. Concurrent operation of the several energized mechanisms will accordingly be assured, for a predetermined interval, by the timer mechanism just described.

The heating unit H may comprise a resistance wire which is coiled around a pair of spaced arcuate bars 61 of dielectric material. As best shown in Fig. 8, these bars which constitute the framework of the heater unit are interconnected by posts 62 in unitary relation. Affixed to each bar near the rearward end thereof is an upwardly extended terminal post 64 in circuit with connections $z$ leading from the switch 55. These posts are extended through holes 66 of the top wall 33 of the forward section F of the blower housing. Surrounding each post is a sleeve 67 of insulating material and mounted on each post are appropriate nuts 68 for exerting a clamping pressure upon terminals which may be affixed to the circuit connections $z$. By some such means as this the heater unit is secured to and carried by the forward section of the blower housing which, when removed from the rear section thereof, will facilitate an inspection of the heater unit or its removal from the housing in case that repairs or replacements are needed. The forward ends of the heater unit framework may rest in contact with a lip 69 (see Fig. 4) that upstands at the delivery mouth of the blower, so as to receive support therefrom.

A feature of importance to this invention is the multi-louvre closure carried by the front section of the blower housing adjacent the mouth where discharge of heated air takes place. As shown best in Fig. 4, a plurality of uniformly spaced slots 71 are cut into the walls 34 along their front edge, each pair of opposite slots to receive trunnions 73 which are formed by rolling the opposite end portions of a light thin blade 74 which is adapted to extend across the discharge mouth of the blower housing. These slots become closed when the gasket 35 is secured in place. The trunnions are substantially aligned with the blade top edge which between the trunnions is rolled into an outset reenforcing bead 75. The lower edge of each blade is inturned at 76 to engage, and follow the contour of, the beaded top edge of the blade immediately therebelow (see Fig. 7). The bottom edge of the lowermost blade (see Fig. 4) lies adjacent the upstanding lip 69 which it is free to engage. The plurality of blades thus mounted provides an assembly of louvres constituting, for the discharge opening of the blower housing, a closure which is self-opening when the blower is operated and self-closing when its operation ceases. In the closed position (see Fig. 7) the several louvres will occupy parallel planes, each being inclined and stepped slightly outwardly with respect to the one below. The blades tend always by gravity to drop into substantially vertical positions with each engaging the bead of the one below, but when the blower is in operation the several louvres will be deflected outwardly to an angle somewhat as represented in Figs. 4 and 7 by the dotted lines, thereby opening up a plurality of passages which permit the heated air to be discharged readily through the front opening 18 of the casing. In practice, the louvres are preferably made of some light-weight material, such as stainless steel, which offers but slight resistance to the moving air which is discharged from the blower, and which will readily respond thereto by an outward deflection as already noted.

In use, the button 46 is pushed in to close the switch 55 whereby to cause energization of the heater unit H and the motors M and S for a predetermined interval. The blower is then operated to discharge air outwardly from the housing. This air becomes heated very quickly so as to be conditioned for its intended purpose as, for example, drying of the hands. After a few moments of concurrent operation of these three units, the switch 55 will be opened, thereby shutting off all operation of the several mechanisms until the next cycle is initiated in the same manner as has just been described.

A feature of this invention is the accessibility of the several mechanisms within the casing whenever the front cover is removed. If the gasket 35 be taken off, then each of the several louvres may be taken out for repair or replacement should such a step be necessary or desirable. Likewise the blower is made accessible by removal of the forward section F of its housing. When this part is taken off, the heater unit comes with it so as to be readily accessible for any repair or replacement, as the case may be. Whenever the front cover is removed, the button separates freely from the switch arm, thereby obviating any need of a disconnecting step at this point. The timer mechanism together with the controlling switch therefor then becomes accessible for any operation that may be required.

Experience with the present electric dryer has demonstrated that it is very effective for its intended purpose. It occupies but a minimum of space upon a wall or other fixed support, and due to the character of the enclosing casing the mechanism therewithin is fully protected so as to remain in serviceable condition over a long period of time.

I claim:

1. An electric dryer combining a blower mechanism, a housing therefor having a discharge opening with surrounding walls defining a rectangular mouth, and a plurality of suspended louvres extended horizontally across the mouth to provide a closure therefor, each louvre comprising a thin blade with end extensions rolled into trunnions in substantial alignment with the top edge of the blade, and means at opposite sides of the mouth providing a pivotal support for each pair of trunnions permitting suspension of the associated louvre to a point of overlap of the louvre immediately therebelow, the entire assembly of louvres being free to swing outwardly to open a passageway through the mouth in response to movement of air outwardly from the blower.

2. An electric dryer according to claim 1, in which the top edge of the blade between the trunnions is rolled into a bead for reenforcing the blade from end to end.

3. An electric dryer according to claim 1, in which the pivotal support for each louvre comprises a pair of open-ended slots extended inwardly of the mouth walls at opposite sides thereof, and a gasket fitted over the mouth to close the open ends of the slots whereby to confine the trunnions operatively therewithin.

4. An electric dryer according to claim 1, in which each louvre blade along its top edge is formed with a bead outset forwardly beyond the proximate face thereof, and in which the free lower edge of each louvre, in the region of overlap opposite the beaded top edge of the louvre immediately therebelow, is curved rearwardly in substantial conformity therewith.

5. An electric dryer according to claim 1, in which an open front casing is provided for reception of the blower and the housing therefor, a front cover is removably secured to the casing over its open front to complete an enclosure for the blower and its housing, a duct open at the front is carried by the front cover opposite the mouth of the blower housing and extended rearwardly to a point adjacent thereto, and an insulating gasket is fitted in place between the duct and blower mouth to maintain an electrical separation therebetween.

6. An electric dryer combining an open front casing, a blower motor and a heater unit mounted within the casing, a normally open switch in circuit with the blower motor and the heater unit for controlling the operation thereof, the switch comprising a contact arm having a free end with a cam thereon, a front cover removably secured to the casing over its open front to provide a closure therefor, and a depressible operating button carried by the front cover provided with a shank extended therethrough for separable engagement with the switch arm cam adapted, when pushed inwardly, to close the switch thereby to complete a circuit to the blower motor and heater unit.

7. An electric dryer according to claim 6, in which an electrically operated timer mechanism is in electrical connection with the switch, and means driven by the timer mechanism is engageable periodically with the switch to open the same.

8. An electric dryer according to claim 6, in which an electrically operated timer mechanism is in electrical connection with the switch, a disc provided with a peripheral cam is driven by the timer mechanism, and means is extended from the switch arm to engage the disc periphery, and when so engaged to maintain the switch in closed position and when engaged with the cam to permit the switch to open.

9. An electric dryer in which is combined a blower motor and a heater unit, a normally open switch in circuit with the blower motor and the heater unit for controlling the operation thereof, and means for initiating operation of the blower motor and heater unit comprising a switch arm, a depressible button with an associated cam for moving the switch arm and adapted, when pushed inwardly, to close the switch thereby to complete a circuit to the blower motor and heater unit, an electrically operated timer mechanism in circuit with the switch, a rotatable disc provided with a peripheral notch driven by the timer mechanism, a follower on the switch arm normally engaging the disc periphery and when so engaged maintaining the switch in closed position and when engaged with the notch permitting the switch to open, and spring-operated latch means carried by the disc movable to and from a position opposite the notch, the latch means being normally engaged with the follower to restrain movement of the latch means to a position opposite the notch but disengaging from the follower concurrently with disengagement of the follower from the notch whereby to free the latch means for movement to a position opposite the notch, the follower being then prevented from re-engaging with the notch until the disc has moved rotatively through its cycle whereby to assure operation of the motor blower and heater unit.

10. An electric dryer according to claim 9 in which the latch means is an arm pivoted to the disc coaxially thereof, and in which a stop is carried by the disc in position to be engaged by the arm when advanced to its position opposite the notch.

11. An electric dryer according to claim 9 in which the latch means is an arm pivoted to the disc coaxially thereof and extending radially therefrom for a distance slightly more than the radius of the disc, and in which the spring for operating the latch arm is a wire hooked thereto toward its free end and extended radially between the arm and the disc for anchorage to a fixed support adjacent the axis thereof.

12. An electric dryer according to claim 9 in which the latch means is an arm pivoted to the disc coaxially thereof and is extended therefrom for a distance in excess of the radius of the disc, and the follower face engaged thereby is inclined to permit gradual advance of the latch arm therealong whereby to prevent the follower at any stage of its movement outwardly of the notch from reversing its movement toward the notch.

13. An electric dryer comprising a motor-operated blower, a housing enclosing the blower and provided with an air discharge opening, the housing comprising plural sections removably connected in unitary relation with the discharge opening wholly contained in one of them, an electrical heating unit supported by the housing section last named and extending between the blower and the air discharge opening and removable as a unit therewith, an open-front casing enclosing the motor-operated blower and the housing therefor, a removable cover for the casing front having therethrough a discharge opening defined by peripheral walls extending forwardly and rearwardly thereof at a point oppositely of and in register with the discharge opening of the blower housing to provide a discharge duct leading to the outside of the casing through the cover at its front, and a gasket of insulating material positioned between the discharge opening of the housing and the discharge duct to separate the one electrically from the other.

14. An electric dryer combining a motor-operated blower, a housing enclosing the blower and provided with an air discharge opening, the housing comprising plural sections removably connected in unitary relation with the discharge opening wholly contained in one of them, an electrical heating unit supported by the housing in the section last named and extending between the blower and the air discharge opening and removable as a unit therewith, there being a plurality of open-ended slots provided at opposite points horizontally of the housing at its air discharge opening, louvres having oppositely extending trunnions pivotally supported in opposite slots of the housing, and a gasket of insulating material secured to the blower housing at its air discharge opening and over the ends of the slots therein to confine the trunnions operatively in place.

ELMER SPENCER HEWITT.

REFERENCES CITED

The following references are of record in the file of this patent:

UNITED STATES PATENTS

| Number | Name | Date |
|---|---|---|
| 981,641 | Halliwell | Jan. 17, 1911 |
| 1,455,034 | Small | May 15, 1923 |
| 1,961,179 | Tinkham | June 5, 1934 |